Nov. 7, 1933.   F. A. CANON   1,933,616
GLASS SUBSTITUTE
Filed May 26, 1932

INVENTOR.
Frank A. Canon,
BY
Arthur G. Connolly
ATTORNEY.

Patented Nov. 7, 1933

1,933,616

UNITED STATES PATENT OFFICE 1,933,616

GLASS SUBSTITUTE

Frank A. Canon, New Brunswick, N. J., assignor to Acetol Products Incorporated, New York, N. Y., a corporation of Delaware Application May 26, 1932. Serial No. 613,776

5 Claims. (Cl. 91—68)

This invention relates to an improved glass substitute and more particularly refers to an article of manufacture which overcomes many of the objections formerly inherent in glass substitutes.

Glass substitutes were formerly made of reticular metallic bases, composed of wires which were round or rectangular in cross section. The wires which were round in cross section were subject to the great disadvantage that they had a very small surface of contact, practically amounting to a point contact at the positions where they crossed one another. This point contact provided very little friction and resulted in the metallic bases of this material being easily distorted. Obviously this ease of distortion caused the flexible composition with which the wire was coated and which filled the meshes to crack, greatly reducing its utility and lessening the life of the material. In order to provide greater resistance to distortion, with this type of wire, it was necessary to decrease the size of the mesh. The natural result of this decrease in the size of the mesh was that less light was permitted to pass through the material as well as requiring the use of considerably more wire which greatly increased the cost of production. Another disadvantage was that the combined thickness of the wires at the positions where the warp and filler wires crossed was exceptionally large. Since the wires had to be completely covered with the flexible composition the use of a large amount of plastic material was necessary, which also increased the cost of production. In addition to increasing the cost of production, the high ridges at the top and bottom of the crossed wires caused the flexible material to be drawn extremely thin and on weathering this thin portion of the film cracked and exposed the wires to corrosion. The highly divergent lens formed by the plastic material in the mesh was very thin at the center and on weathering developed small holes. The cavities formed by the highly divergent lens also resulted in the retention of dirt and moisture and further decreased the amount of light which was transmitted.

The wires of rectangular cross section have more surface of contact at the place of crossing than the round wires and therefore have somewhat greater resistance to distortion. However, due to the springiness of the wires the surface of contact is generally confined to the two edges of the flat surface, very little if any contact taking place on the large surface between these edges. Also the sharp edges cause the film to fail upon weathering and expose the wires to corrosion. This failure of the film at the sharp edges and the relatively low resistance to distortion of the reticular base greatly lessens the period of usefulness of the article. If an additional amount of flexible material is coated over the reticular base in order to prevent weathering at the sharp edges the cost of production is tremendously increased and the product is still subject to the objection that a slight application of force will cause it to be distorted and crack the flexible material. Decreasing the size of the mesh and increasing the size of the wires, in order to provide greater resistance to distortion, results in a decrease in the amount of light transmitted as well as increasing the cost of production.

It is an object of this invention to eliminate the above mentioned objections and produce an article which is much more desirable from a commercial standpoint. A further object is to produce an article which provides greater resistance to distortion; permits a considerably greater percentage of light to be transmitted than was formerly possible; is cheaper to manufacture, and has a much longer life than glass substitutes now in use. A still further object is to provide a glass substitute which has exceptional flexibility and resistance to distortion and which may be subjected to extremely rough usage without decreasing its effectiveness. Additional objects will appear hereinafter.

Referring to the accompanying drawing.

Figure 1:
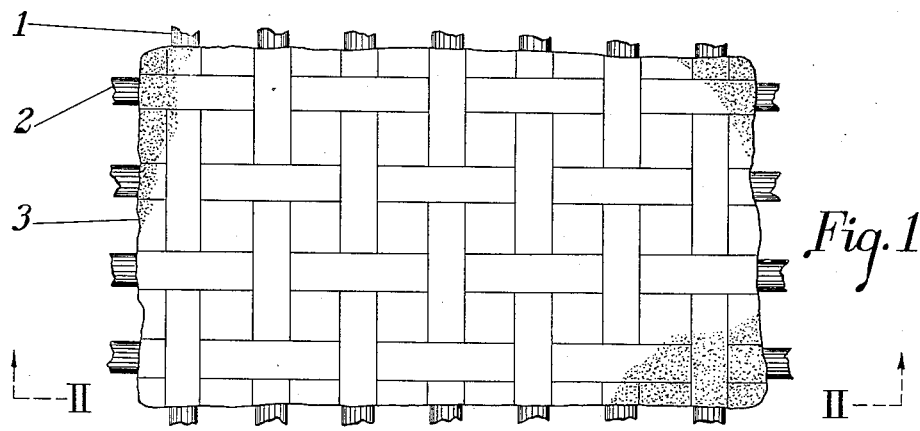
Fig. 1 represents a plan view of an article having a woven wire base, wherein 1 refers to the filler wires, 2 to the warp wires, and 3 to the flexible composition.
Figure 2:
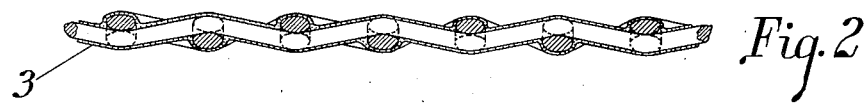
Fig. 2 represents a cross section along the line II—II of Fig. 1.

The previously mentioned objects are accomplished by the present invention whereby a reticular metallic base composed of wires substantially oval in cross section is formed. The meshes of this base are filled with a flexible composition which also covers the metallic base. The oval cross section is designed so that the top and bottom curvatures are quite similar and the curvatures of the warp and filler wires where they cross are substantially the same.

A greater arc of contact is thereby secured than can be practically secured with round or rectangular wires. This large surface of contact gives considerable friction and provides exceptional resistance to distortion. Since the reticular base can be distorted only with difficulty the plastic composition with which the base is treated remains intact throughout prolonged usage and rough handling. The greater resistance to distortion of the base permits the use of a larger mesh, which results in the transmission of an increased proportion of light and decreases the cost of production to a considerable extent.

The advantages of the product of the present invention will be readily appreciated by a consideration of the following series of tests:

Tests were made upon three squares of screen 36x36". 14 mesh round wire, 12 mesh flat wire and 12 mesh oval wire screens were tested. Each square was folded with a 1" seam at diagonal corners to provide a strong anchorage and a secure purchase for the weights which were attached. The screen was fastened to a strong beam and marks were made 36" apart on the diagonal. A ½ lb. weight was then fastened to the bottom. The distances between points were then measured. This was repeated using weights of 1½ lbs., 3½ lbs., and 5½ lbs. with the following results:

| Weight | 14 mesh round inches | 12 mesh flat inches | 12 mesh oval inches |
|---|---|---|---|
| Pounds | | | |
| 0 | 36 | 36 | 36 |
| ½ | 36¼ | 36 | 36 |
| 1½ | 36¾ | 36 | 36 |
| 3½ | 38 9/16 | 36½ | 36 1/16 |
| 5½ | 40 | 37 9/16 | 36 5/8 |

The combined thickness of warp and filler wires is much smaller than in the case of round wires and the ridges noticeable at the top and bottom of round wires are missing. Less plastic material is therefore required to fill the mesh and cover the wire base. Also the absence of the high ridges prevents the plastic coating from being drawn thin at these places and consequently avoids cracking of the film upon weathering and exposure of the underlying base to corrosion. Not only is the life of the material prolonged thereby but the cost of its production is appreciably decreased. The reticular base, since it does not have the high ridges of a base produced from round wires, more closely approximates a flat surface and when the plastic material is applied thereto no deep cavities are formed to retain dirt and moisture and decrease the amount of light transmitted.

The superiority of the product of the present invention over a glass substitute made with a rectangular wire base is equally as marked as in the case of the round wire base. Here again the tremendous increase in the surface of contact results in an article having much greater resistance to distortion. While the rectangular wire does not have the high ridges of the round wire, nevertheless, it has sharp edges along which the film cracks upon weathering, causing the underlying metallic base to corrode. The product of the present invention has neither high ridges nor sharp edges to cause failure of the plastic film and corrosion of the base.

Summarizing, the product of the present invention has the following advantages over a glass substitute using either the round wire base or the rectangular wire base. It has much greater resistance to distortion due to the exceptionally large surface of contact where the wires cross, the plastic material therefore is not cracked and the article rendered useless upon rough handling. For a given resistance to distortion, a larger mesh and fewer wires may be used, consequently the light transmission is greater and the cost of production is appreciably lessened. It has no high ridges nor sharp edges to cause cracking of the film upon weathering and exposure of the base to corrosion. In addition, it does not have the deep cavities present in articles having a round wire base so there is no tendency to collect dirt and moisture, further decreasing the light transmitted as well as causing failure of the film at the center of the mesh.

The wire of which the base is constructed may be dull galvanized thereby increasing the resistance to distortion due to the rough surface. It may also be treated by various other methods well known in the art, for example, hot galvanizing or tinning, or it may be used without any treatment. It is substantially oval or elliptical, these words being taken as synonomous, in cross section and may be produced by passing round wire between rolls in which grooves have been cut, extruding or drawing the metal through an oval die, or by rounding the corners of rectangular wire.

Figure 3:
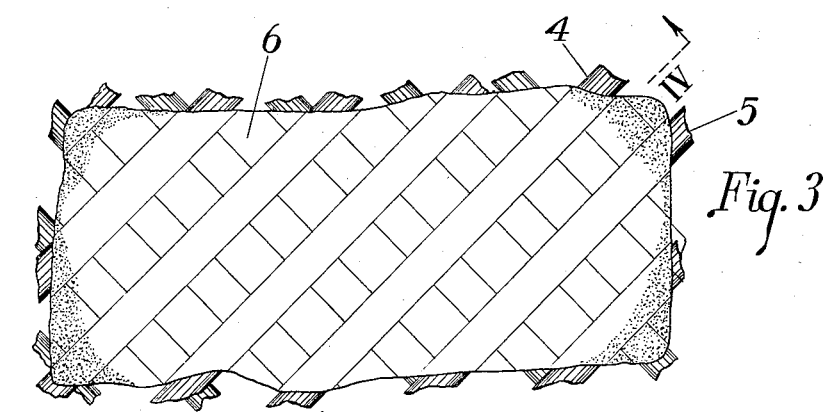
Fig. 3 represents a plan view of an article wherein the wires running in one direction are placed upon and at an angle to the wires running in a different direction. In this figure, 5 refers to the wires placed upon and at an angle to the wires referred to by 4, and 6 refers to the flexible composition.
Figure 4:
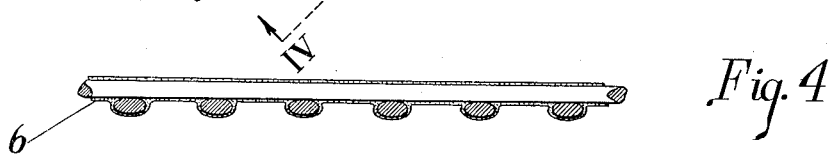
Fig. 4 represents a cross section along the line IV—IV of Fig. 3.

The base may be constructed with straight or crimped fillers. The wires may also be adjacently positioned, as shown in Figs. 3 and 4, by placing the filler wires upon and at an angle to the warp wires and joining them by any suitable means, such as soldering, brazing, or welding. The wires usually cross one another at right angles but this is by no means necessary since they may cross at a different angle, producing meshes having a diamond or some other geometrical shape.

The plastic material may be composed of any of the materials well known in the art which are adapted to wet the strands of the base and follow the expansion and contraction thereof without cracking. Some of the materials which have been used with excellent results are cellulose esters, such as cellulose acetate, to which has been added a plasticizer and a solvent. Very satisfactory results have been obtained with a plastic material composed of 100 pounds of cellulose acetate, 20 pounds of ethyl-paratoluolsulfonamide, and 100 gallons of light solvent. This plastic material may be substantially transparent or it may be semi-transparent, translucent or opaque; the various degrees of transparency being obtained by the addition of well known substances, such as lamp black and talc, to the plastic composition.

The plastic material may be applied in such manner that the thickness of the film in the mesh is substantially the same thickness as the oval wires forming the base or a greater or less amount of plastic material may be used in which case the thickness of the film in the mesh would be correspondingly greater or less than the thickness of the oval wires. The amount of material used can be so regulated that the film in the mesh is in the form of a divergent lens or is substantially a flat surface. The reticular metallic base may also be placed between two sheets of plastic material and joined by the application of pressure.

For some purposes a different type of glass substitute may be desired than for others and the most suitable type, for any given purpose, may therefore easily be obtained by a selection of the proper components, as described above.

As many apparently widely different embodiments of this invention may be made without departing from the spirit and scope thereof, it is to be understood that I do not limit myself to the specific embodiments thereof except as defined in the appended claims.

I claim:

1. An article which comprises a reticular metallic base, composed of wires elliptical in cross section, coated with a flexible cellulose derivative composition, which composition fills the meshes of the base with a film having the general shape of a divergent lens.

2. An article which comprises a reticular metallic base, composed of wires elliptical in cross section, coated with a flexible cellulose ester composition, which composition fills the meshes of the base with a film having the general shape of a divergent lens.

3. An article which comprises a reticular metallic base, composed of adjacently-positioned wires elliptical in cross section, coated with a flexible cellulose ester composition, which composition fills the meshes of the base with a film having the general shape of a divergent lens.

4. An article which comprises a reticular metallic base, composed of woven wires elliptical in cross section, coated with a flexible cellulose ester composition, which composition fills the meshes of the base with a film having the general shape of a divergent lens.

5. The article of claim 4 wherein the cellulose ester is cellulose acetate.

FRANK A. CANON.